United States Patent
Kayama et al.

(10) Patent No.: US 12,364,954 B2
(45) Date of Patent: Jul. 22, 2025

(54) POROUS MEMBRANE

(71) Applicant: ASAHI KASEI MEDICAL CO., LTD., Tokyo (JP)

(72) Inventors: Yuzo Kayama, Tokyo (JP); Masayasu Komuro, Tokyo (JP); Tetsuya Hamasaki, Tokyo (JP)

(73) Assignee: ASAHI KASEI MEDICAL CO., LTD., Tokyo (JP)

( * ) Notice: Subject to any disclaimer, the term of this patent is extended or adjusted under 35 U.S.C. 154(b) by 582 days.

(21) Appl. No.: 17/204,203

(22) Filed: Mar. 17, 2021

(65) Prior Publication Data

US 2021/0197133 A1 Jul. 1, 2021

Related U.S. Application Data

(63) Continuation of application No. 15/506,521, filed as application No. PCT/JP2015/073915 on Aug. 25, 2015, now Pat. No. 11,338,248.

(30) Foreign Application Priority Data

Aug. 25, 2014 (JP) .................................. 2014-170768

(51) Int. Cl.
B01D 69/08 (2006.01)
B01D 67/00 (2006.01)
(Continued)

(52) U.S. Cl.
CPC ......... B01D 69/08 (2013.01); B01D 67/0009 (2013.01); B01D 67/003 (2013.01);
(Continued)

(58) Field of Classification Search
CPC ............ B01D 2323/02; B01D 2323/06; B01D 2323/22; B01D 2325/02; B01D 2325/20;
(Continued)

(56) References Cited

U.S. PATENT DOCUMENTS

| 5,340,480 A | 8/1994 | Kawata et al. |
| 5,407,581 A | 4/1995 | Onodera et al. |

(Continued)

FOREIGN PATENT DOCUMENTS

| EP | 1206961 | 5/2002 |
| JP | H06-165926 | 6/1994 |

(Continued)

OTHER PUBLICATIONS

Fallahianbijan et al., Impact of Protein Fouling on Nanoparticle Capture within the Viresolve Pro™ and Viresolve™ NFP Virus Removal Membranes, *Biotechnology and Bioengineering*, (2019); pp. 1-7.

(Continued)

*Primary Examiner* — Terry K Cecil
(74) *Attorney, Agent, or Firm* — GREENBLUM & BERNSTEIN, P.L.C.

(57) ABSTRACT

A porous membrane containing a hydrophobic polymer and a water-insoluble hydrophilic polymer, the porous membrane having a dense layer in the downstream portion of filtration in the membrane, having a gradient asymmetric structure in which the average pore diameter of fine pores increases from the downstream portion of filtration toward the upstream portion of filtration, and having a gradient index of the average pore diameter from the dense layer to the coarse layer of 0.5 to 12.0.

14 Claims, 1 Drawing Sheet

(51) Int. Cl.
  *B01D 69/00* (2006.01)
  *B01D 69/02* (2006.01)
  *B01D 69/06* (2006.01)
  *B01D 71/06* (2006.01)
  *B01D 71/34* (2006.01)
  *B01D 71/68* (2006.01)

(52) U.S. Cl.
  CPC ......... *B01D 67/0088* (2013.01); *B01D 69/00* (2013.01); *B01D 69/02* (2013.01); *B01D 69/06* (2013.01); *B01D 71/34* (2013.01); *B01D 71/68* (2013.01); *B01D 71/06* (2013.01); *B01D 2323/02* (2013.01); *B01D 2323/06* (2013.01); *B01D 2323/22* (2013.01); *B01D 2325/02* (2013.01); *B01D 2325/20* (2013.01); *B01D 2325/36* (2013.01); *C08J 2201/0464* (2013.01)

(58) Field of Classification Search
  CPC ............ B01D 2325/36; B01D 67/0009; B01D 67/003; B01D 67/0088; B01D 69/00; B01D 69/02; B01D 69/06; B01D 69/08; B01D 71/06; B01D 71/28; B01D 71/34; B01D 71/68; C08J 2201/0464; Y02A 50/30
  See application file for complete search history.

(56) References Cited

U.S. PATENT DOCUMENTS

| | | | |
|---|---|---|---|
| 5,834,107 | A | 11/1998 | Wang et al. |
| 5,906,742 | A | 5/1999 | Wang et al. |
| 9,415,353 | B2 | 8/2016 | Moya et al. |
| 2004/0050791 | A1 | 3/2004 | Herczeg |
| 2006/0016748 | A1 | 1/2006 | Koguma et al. |
| 2007/0084788 | A1 | 4/2007 | Moya et al. |
| 2007/0199891 | A1* | 8/2007 | Mabuchi ............... D01D 5/24 264/41 |
| 2010/0190965 | A1 | 7/2010 | Yamaguchi et al. |
| 2012/0074063 | A1 | 3/2012 | Krause et al. |
| 2012/0076934 | A1 | 3/2012 | Tkacik et al. |
| 2012/0305472 | A1 | 12/2012 | Yokota et al. |
| 2013/0056420 | A1 | 3/2013 | Wang et al. |
| 2015/0232506 | A1 | 8/2015 | Ashitaka et al. |

FOREIGN PATENT DOCUMENTS

| | | |
|---|---|---|
| JP | 4024041 | 12/2007 |
| JP | 2010-059395 | 3/2010 |
| JP | 4504963 | 7/2010 |
| JP | 2012-527341 | 11/2012 |
| JP | 5403444 | 1/2014 |
| WO | 2001/014047 | 3/2001 |
| WO | 2004/035180 | 4/2004 |
| WO | 2008/156124 | 12/2008 |
| WO | 2011/111679 | 9/2011 |

OTHER PUBLICATIONS

Fallahianbijan et al., Quantitative Analysis of Internal Flow Distribution and Pore Interconnectivity within Asymmetric Virus Filtration Membranes, Journal of Membrane Science, 595 (2020) 117578; pp. 1-9.
Tanis-Kanbur et al., "Porosimetric Membrane Characterization Techniques: A review," Journal of Membrane Science, 619 (2021) 118750; pp. 1-27.
Adan-Kubo et al., "Microscopic Visualization of Virus Removal by Dedicated Filters Used in Biopharmaceutical Processing: Impact of Membrane Structure and Localization of Capture Virus Particles," Biotechnology Progress, (2019); pp. 1-11.
Ignacio Arganda-Carreras et al., "Classic Watershed (IJPB-plugins)," Classic Watershed plugin for ImageJ, (retrieved from https://imagej.net/Classic_Watershed on Mar. 21, 2019).
Shin-Ichi Nakao, "Determination of Pore Size and Pore Size Distribution 3. Filtration Membranes," Journal of Membrane Science, 1994, vol. 96, pp. 131-165.
Hadi Nazem-Bokaee et al., "Probing Pore Structure of Virus Filters Using Scanning Electron Microscopy with Gold Nanoparticles," Journal of Membrane Science, 2018, vol. 552, pp. 144-152.
"Viresolve® Pro Solution Performance Guide," from EMD Millipore, 2014.
Office Action in Chinese Application No. 201580042469.4 issued on Sep. 28, 2018.
Office Action in Korean Application No. 10-2016-7029934 issued on Feb. 12, 2018.
Notice of Final Rejection in Korean Application No. 10-2016-7029934 issued on Sep. 18, 2018.
Bioprocess Online News, "EMD Millipore Granted Patent For Selective Layering Method That Improves the Consistency of Virus Filtration Performance," published Mar. 25, 2015 (retrieved Dec. 27, 2018 from https://www.bioprocessonline.com/doc/emd-millipore-granted-patent-improves-the-consistency-virus-filtration-performance-0001).
G. Dutton, "Strategies for Removing Viruses from Cell Lines", Genetic and Engineering News, 29(10), published May 15, 2009 (available at https://www.genengnews.com/magazine/113/strategies-for-removing-viruses-from-cell-lines/).
G. Boiton, et al., "Achieving High Mass—Throughput of Therapeutic Proteins Through Parvovirus Retentive Filters," (2010) Biotechnology Progress, 26(6):1671-1677, available online Sep. 21, 2010.
S. Giglia, et al., "Measurement of Pore Size Distribution and Prediction of Membrane Filter Virus Retention Using Liquid-liquid Porometry", (2015) Journal of Membrane Science, 476:399-409, available online Dec. 8, 2014.
M. Bakhshayeshi, et al., "Use of Confocal Scanning Laser Microscopy to Study Virus Retention During Virus Filtration," (2011) Journal of Membrane Science, 379:260-267, available online Jun. 6, 2011.
Statement of Grounds and Particulars by the Opponent against Australian Patent Application No. 2015309939 filed on Jan. 2, 2019.
Supplemental European Search Report issued in Patent Application No. 15836578.3, dated Aug. 10, 2017.
International Search Report issued with respect to Application No. PCT/JP2015/073915, dated Nov. 24, 2015.
International Preliminary Report on Patentability issued with respect to Application No. PCT/JP2015/073915, dated Feb. 28, 2017.
Masahiro Oda et al., "Discusion on Issues and Cases of Viral Clearance Tests", PDA Journal of GMP and Validation in Japan, vol. 7, No. 1, pp. 44, 2005.

* cited by examiner

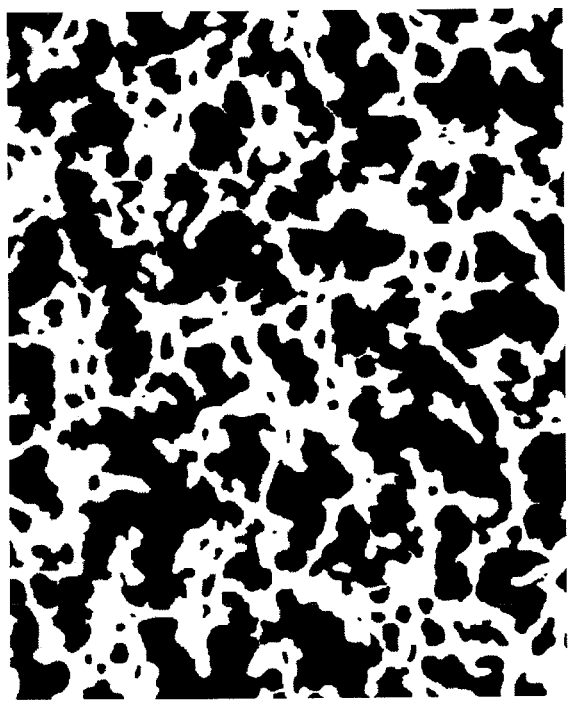
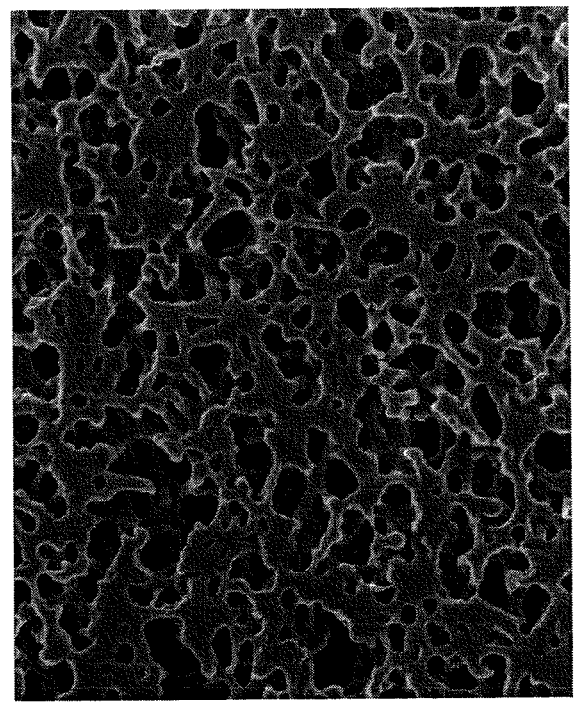

POROUS MEMBRANE

CROSS-REFERENCE TO RELATED APPLICATIONS

This is a continuation application of U.S. patent application Ser. No. 15/506,521, filed on Feb. 24, 2017, which is a U.S National Phase of International Patent Application No. PCT/JP2015/073915, filed on Aug. 25, 2015 which claims priority to Japanese Patent Application No. 2014-170768, filed on Aug. 25, 2014. The disclosure of each of these applications is herein incorporated by reference in its entirety.

TECHNICAL FIELD

The present invention relates to a porous membrane.

BACKGROUND ART

In recent years, medical treatments using fractionated plasma products and biopharmaceutical as medicines have been widespread because of few side effects and a high treatment effectiveness. However, the fractionated plasma products are derived from human blood, the biopharmaceutical are derived from animal cells, and therefore there is a risk that pathogenic substances such as viruses are contaminated into medicines.

In order to prevent contamination of viruses into medicines, removal or inactivation of viruses has surely been conducted. Examples of the method for removing or inactivating a virus include heat treatment, optical treatment, and treatment with chemicals. A membrane filtration method that is effective for all the viruses irrespective of their thermal and chemical characteristics has been received attention in terms of the problems of protein denaturation, efficiency of inactivating a virus, and contamination of chemicals.

Examples of the virus to be removed or inactivated include: a poliovirus (25-30 nm diameter); a parvovirus (18-24 nm diameter) as the smallest virus; and an HIV (80-100 nm diameter) as a relatively large virus. In recent years, there is a growing need particularly for removal of small viruses such as the parvovirus.

The first performance required for a virus removal membrane is safety. The safety includes safety not allowing the contamination of pathogenic substances such as viruses into fractionated plasma products and biopharmaceutical and safety not allowing the contamination of foreign materials such as an eluate from a virus removal membrane into fractionated plasma products and biopharmaceutical.

As the safety not allowing the contamination of pathogenic substances such as viruses, it becomes important to remove viruses sufficiently with a virus removal membrane. In Non Patent Literature 1, it is said that the clearance (LRV) to be the target for a mice minute virus or a porcine parvovirus is 4.

Moreover, as the safety not allowing the contamination of foreign materials such as an eluate, it becomes important not to allow the eluate to come out of a virus removal membrane.

The second performance required for the virus removal membrane is productivity. The productivity means recovering protein, such as albumin of 5 nm size and globulin of 10 nm size, efficiently. An ultrafiltration membrane and a hemodialysis membrane each having a pore diameter of around several nanometers, and a reverse osmosis membrane having a further smaller pore diameter are not suitable as a virus removal membrane because the protein blocks the pores during filtration. Particularly in the case where removal of a small virus such as a parvovirus is intended, it has been difficult to achieve both the safety and the productivity because the size of the virus and the size of protein are similar.

Patent Literature 1 discloses a virus removal method using a membrane that contains regenerated cellulose.

Patent Literature 2 discloses a virus removal membrane obtained by hydrophilizing a surface of a membrane by a graft polymerization method, the membrane formed through a thermally induced phase separation method and containing polyvinylidene fluoride (PVDF).

Moreover, Patent Literature 3 discloses a virus removal membrane having a surface coated with a hydroxyalkyl cellulose and having an initial logarithmic reduction value (LRV) of at least 4.0 to PhiX174.

Patent Literature 4 discloses a virus removal membrane formed from a blended state of a polysulfone-based polymer and a polyvinylpyrrolidone (PVP).

Patent Literature 5 discloses a virus removal membrane obtained by coating a membrane formed from a blended state of a polysulfone-based polymer and a copolymer of vinylpyrrolidone and vinyl acetate with a polysaccharide or a polysaccharide derivative.

CITATION LIST

Patent Literature

Patent Literature 1: Japanese Patent No. 4024041
Patent Literature 2: International Publication No. WO 2004035180
Patent Literature 3: Japanese Patent No. 4504963
Patent Literature 4: International Publication No. WO 2011111679
Patent Literature 5: Japanese Patent No. 5403444

Non Patent Literature

Non Patent Literature 1: PDA Journal of GMP and Validation in Japan, vol. 7, No. 1, p. 44 (2005)

SUMMARY OF INVENTION

Technical Problem

However, according to the technique disclosed in Patent Literature 1, even though a satisfactory protein recovery rate can be exhibited under a low flux condition, it is difficult to set filtration pressure to be high because cellulose has a low strength in a state where it is wetted with water, making it difficult to obtain a high permeation speed, and therefore there is still room for improvement in terms of efficient protein recovery.

According to the technique disclosed in Patent Literature 2, with respect to membranes produced by a thermally induced phase separation method, it is difficult to prepare a membrane having a gradient asymmetric structure in which pore diameters of fine pores change in a membrane thickness direction, and the membranes produced by a thermally induced phase separation method generally have a homogeneous structure. Accordingly, a high permeation speed cannot be obtained when compared with the permeation speed of membranes having a gradient asymmetric structure.

Moreover, as for the technique disclosed in Patent Literature 3, even though there is a disclosure on the initial LRV, but a virus removability with time is not described sufficiently. Furthermore, in order to realize an efficient protein recovery, it is important to suppress lowering of flux with time, but studies on suppressing the lowering of flux has not been conducted sufficiently.

The technique disclosed in Patent Literature 4 relates to a membrane in which, when 0.5 wt % of an immunoglobulin solution is subjected to dead-end filtration at a constant pressure of 1.0 bar for 60 minutes, the filtration time and the integrated amount of the filtrate recovered are substantially in a linear relationship, but, in the graph obtained by plotting the filtration time in the horizontal axis and the integrated amount of the filtrate recovered in the vertical axis, the integrated amount of the filtrate recovered from 0 to 5 minutes after starting filtration, namely during an interval where the drop in the permeability intrinsically occurs most frequently, is not plotted. Thus, when the graph is converted by linear regression through the origin, it is found that, substantially, clogging is not suppressed sufficiently. Moreover, filtration is generally conducted for 60 minutes or longer when a virus removal membrane is used, and therefore in order to achieve both the protein recovery in a highly efficient manner and the maintenance of the durability of the virus removability, it is required to suppress the lowering of the flux in a later stage of filtration time, but sufficient studies have not been conducted yet on the lowering of the flux when filtration is conducted for 60 minutes or longer.

In the technique disclosed in Patent Literature 5, it is shown that the filterability of protein is improved by coating the membrane with a polysaccharide. The improvement is an effect obtained by suppressing the adsorption of protein. However, the fact that the filtration pressure increases to 3 bar under constant rate filtration means that clogging substantially occurs during the filtration, and therefore it is considered that the physical blocking of pores during filtration is not sufficiently suppressed. Moreover, the method for suppressing the lowering of the flux with time is not sufficiently studied.

The problem to be solved by the present invention is to provide a porous membrane by which a useful component can be recovered in a highly efficient manner while suppressing clogging during filtration of a protein solution and from which only a small amount of an eluate is eluted even when an aqueous solution is filtered.

As a result of conducting diligent studies for the purpose of solving the problem, the present inventors have completed the present invention by finding that the problem can be solved with a porous membrane having a particular configuration.

That is to say, the present invention is as follows.

(1)
A porous membrane containing:
a hydrophobic polymer; and
a water-insoluble hydrophilic polymer, the porous membrane having:
a dense layer in a downstream portion of filtration in the membrane;
a gradient asymmetric structure wherein an average pore diameter of fine pores increases from the downstream portion of filtration toward an upstream portion of filtration; and
a gradient index of the average pore diameter from the dense layer to a coarse layer of 0.5 to 12.0.

(2)
A porous membrane containing:
a hydrophobic polymer; and
a water-insoluble hydrophilic polymer, the porous membrane having:
a dense layer in a downstream portion of filtration in the membrane;
a gradient asymmetric structure wherein an average pore diameter of fine pores increases from the downstream portion of filtration toward an upstream portion of filtration;
an integrated permeability of immunoglobulin for 180 minutes of 8.0 to 20.0 kg/m$^2$ when 1.5% by mass of the immunoglobulin is filtered at a constant pressure of 2.0 bar; and
a ratio of immunoglobulin flux F180 at 180 minutes after starting filtration to immunoglobulin flux F60 at 60 minutes after starting filtration of 0.70 or more.

(3)
The porous membrane according to (1) or (2), wherein an existence ratio of pores of 10 nm or smaller in the dense layer is 8.0% or less.

(4)
The porous membrane according to any of (1) to (3), wherein a value of a standard deviation of pore diameters/the average pore diameter in the dense layer is 0.85 or less.

(5)
The porous membrane according to any of (1) to (4), wherein an existence ratio of pores of larger than 10 nm and 20 nm or smaller in the dense layer is 20.0% or more and 35.0% or less.

(6)
The porous membrane according to any of (1) to (5), wherein a porosity in the dense layer is 30.0% or more and 45.0% or less.

(7)
The porous membrane according to any of (1) to (6), wherein the water-insoluble hydrophilic polymer is electrically neutral.

(8)
The porous membrane according to any of (1) to (7), wherein a pure water permeation rate is 160 to 500 L/hr·m$^2$·bar.

(9)
The porous membrane according to any of (1) to (8), wherein a bubble point is 1.40 to 1.80.

(10)
The porous membrane according to any of (1) to (9), wherein a thickness of the dense layer is 1 to 8 μm.

(11)
The porous membrane according to any of (1) to (10), wherein the hydrophobic polymer is a polysulfone-based polymer.

(12)
The porous membrane according to any of (1) to (11), wherein the water-insoluble hydrophilic polymer is a vinyl-based polymer.

(13)
The porous membrane according to any of (1) to (12), wherein the water-insoluble hydrophilic polymer is a polysaccharide or a derivative thereof.

(14)
The porous membrane according to any of (1) to (13), wherein the water-insoluble hydrophilic polymer is a polyethylene glycol or a derivative thereof.

(15)
The porous membrane according to any of (1) to (14), for removing a virus contained in a protein solution.

Advantageous Effects of Invention

According to the present invention, a porous membrane by which a useful component such as protein can be recovered in a highly efficient manner while suppressing clogging during filtration of a protein solution and from which only a small amount of an eluate is eluted even when an aqueous solution is filtered can be provided.

BRIEF DESCRIPTION OF DRAWING

FIG. 1 shows an example of a result obtained by binarizing an image observed with a scanning electron microscope into pore portions and solid portions, and white portions represent pore portions and black portions represent solid portions.

DESCRIPTION OF EMBODIMENTS

Hereinafter, embodiments for carrying out the present invention (hereinafter, referred to as "present embodiments") will be described. The present invention is not limited to the following embodiments, and various modifications of the embodiments can be carried out within the scope of the gist of the present invention.

The porous membrane according to the present embodiments contains a hydrophobic polymer and a water-insoluble hydrophilic polymer, has a dense layer in the downstream portion of filtration in the membrane, a gradient asymmetric structure in which the average pore diameter of fine pores increases from the downstream portion of filtration toward the upstream portion of filtration, and a gradient index of the average pore diameter from the dense layer to the coarse layer of 0.5 to 12.0.

The porous membrane according to the present embodiments contains a hydrophobic polymer and a water-insoluble hydrophilic polymer.

In the present embodiments, examples of the hydrophobic polymer usable as a base material of the membrane include polyolefins, polyamides, polyimides, polyesters, polyketones, PVDF, poly(methyl methacrylate), polyacrylonitrile, and polysulfone-based polymers.

Polysulfone-based polymers are preferable from the viewpoint of high membrane-forming properties and control of the membrane structure.

The hydrophobic polymers may be used singly or in mixtures of two or more.

Polysulfone-based polymers refer to polysulfones (PSf) having a repeating unit represented by formula 1 below, or polyethersulfones (PES) having a repeating unit represented by formula 2 below, and polyethersulfones are preferable.

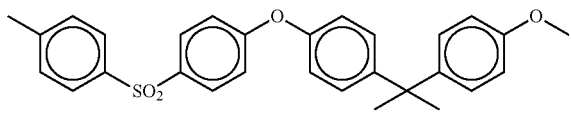

Formula 1

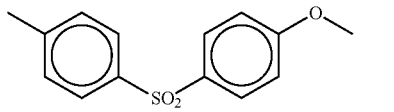

Formula 2

The polysulfone-based polymers may contain a substituent such as a functional group or an alkyl group, or a hydrogen atom in the hydrocarbon skeletons may be substituted by another atom such as a halogen or a substituent in the structures represented by formula 1 and formula 2.

The polysulfone-based polymers may be used singly or in mixtures of two or more.

The porous membrane according to the present embodiments contains a water-insoluble hydrophilic polymer.

In view of preventing drastic lowering of the filtration speed caused by clogging of the membrane due to adsorption of protein, the porous membrane according to the present embodiments is hydrophilized by allowing the water-insoluble hydrophilic polymer to exist at the surface of fine pores of a base material membrane containing a hydrophobic polymer.

Examples of the method for hydrophilizing a base material membrane include coating, graft reaction, and crosslinking reaction after forming the base material membrane containing a hydrophobic polymer. The base material membrane may also be hydrophilized by coating, graft reaction, crosslinking reaction, or the like after subjecting a hydrophobic polymer and a hydrophilic polymer to blend membrane-forming.

In the present embodiments, the hydrophilic polymer refers to a polymer that makes a contact angle 90 degrees or less when PBS (a solution obtained by dissolving 9.6 g of powdered Dulbecco's PBS (−) "Nissui" commercially available from Nissui Pharmaceutical Co., Ltd. in water to make the total amount 1 L) is brought into contact with film of the polymer.

In the present embodiments, it is preferable that the contact angle of the hydrophilic polymer is 60 degrees or less, and more preferably 40 degrees or less. In the case where the hydrophilic polymer having a contact angle of 60 degrees or less is contained, the porous membrane is easily wetted with water, and in the case where the hydrophilic polymer having a contact angle of 40 degrees or less is contained, the tendency that the porous membrane is easily wetted with water is further remarkable.

The contact angle means an angle made by a surface of a water droplet with a film when the water droplet is dropped onto a surface of the film, and the contact angle is defined in JIS R3257.

In the present embodiments, the term "water-insoluble" means an elution ratio of 0.1% or less in the case where a filter assembled so as to have an effective membrane area of 3.3 cm$^2$ is used for dead-end filtration at a constant pressure of 2.0 bar with 100 mL of pure water of 25° C.

The elution ratio is calculated according to the following method.

A filtrate obtained by filtering 100 mL of pure water of 25° C. is recovered and concentrated. The amount of carbon is measured using the obtained concentrated liquid with a total organic carbon meter TOC-L (manufactured by Shimadzu Corporation) to calculate the elution ratio from the membrane.

In the present embodiments, the water-insoluble hydrophilic polymer refers to a substance that satisfies the above-described contact angle and elution ratio. The water-insoluble hydrophilic polymers not only include hydrophilic polymers in which the substance itself is water-insoluble but also include hydrophilic polymers that are insolubilized to water in a production process thereof even though the hydrophilic polymers are originally water-soluble hydrophilic polymers. That is to say, even though a hydrophilic polymer is a water-soluble hydrophilic polymer, the hydrophilic polymer is included in the water-insoluble hydrophilic polymers in the present embodiments as long as the hydrophilic polymer is a substance that satisfies the above-described contact angle and also satisfies the above-described elution ratio in the dead-end filtration at a constant pressure after fabricating a filter as a result of being insolubilized to water in the production process.

It is preferable that the water-insoluble hydrophilic polymer is electrically neutral in view of preventing adsorption of protein as a solute.

In the present embodiments, the term "electrically neutral" means "not having a charge within a molecule" or means that the amount of cations and the amount of anions are equal within a molecule.

Examples of the water-insoluble hydrophilic polymer include vinyl-based polymers.

Examples of the vinyl-based polymer include: homopolymers of hydroxyethyl methacrylate, hydroxypropyl methacrylate, dihydroxyethyl methacrylate, diethylene glycol methacrylate, triethylene glycol methacrylate, poly(ethylene glycol) methacrylate, vinylpyrrolidone, acrylamide, dimethylacrylamide, glucoxyoxyethyl methacrylate, 3-sulfoprpyl methacryloxyethyl dimethylammonium betaine, 2-methacryloyloxyethyl phosphorylcholine, 1-carboxydimethyl methacryloyloxyethyl methane ammonium, or the like; and random copolymers, graft type copolymers, and block type copolymers of a hydrophobic monomer such as styrene, ethylene, propylene, propyl methacrylate, butyl methacrylate, ethylhexyl methacrylate, octadecyl methacrylate, benzyl methacrylate, or methoxyethyl methacrylate, and a hydrophilic monomer such as hydroxyethyl methacrylate, hydroxypropyl methacrylate, dihydroxyethyl methacrylate, diethylene glycol methacrylate, triethylene glycol methacrylate, poly(ethylene glycol) methacrylate, vinylpyrrolidone, acrylamide, dimethylacrylamide, glucoxyoxyethyl methacrylate, 3-sulfopropyl methacryloxyethyl dimethylammonium betaine, 2-methacryloyloxyethyl phosphorylcholine, or 1-carboxydimethyl methacryloyloxyethyl methane ammonium.

Moreover, examples of the vinyl-based polymer also include copolymers of a cationic monomer such as dimethylaminoethyl methacrylate or diethylaminoethyl methacrylate, an anionic monomer such as acrylic acid, methacrylic acid, vinylsulfonic acid, sulfopropyl methacrylate, or phosphoxyethyl methacrylate, and the above-described hydrophobic monomer, and the vinyl-based polymer may also be a polymer containing equal amounts of anionic monomers and cationic monomers so as to be electrically neutral.

Examples of the water-insoluble hydrophilic polymer also include cellulose being a polysaccharide and cellulose triacetate being a derivative of cellulose. Moreover, the polysaccharides and derivatives thereof include materials obtained by subjecting hydroxy alkyl cellulose or the like to crosslinking treatment.

The water-insoluble hydrophilic polymers may be polyethylene glycols and derivatives thereof, block copolymers of ethylene glycol and the above-described hydrophobic monomer, random copolymers or block copolymers of ethylene glycol and propylene glycol, ethyl benzyl glycol, or the like. Moreover, the polyethylene glycols and the above-described copolymers may be insolubilized to water by substituting one end or both ends thereof with a hydrophobic group.

Examples of the compound obtained by substituting one end or both ends of polyethylene glycols with a hydrophobic group include α,ω-dibenzyl polyethylene glycols and α,ω-didodecyl polyethylene glycols, and the compound may be, for example, a copolymer of a polyethylene glycol and a hydrophobic monomer such as a dichlorodiphenyl sulfone having a halogen group at both ends within the molecule thereof.

Examples of the water-insoluble hydrophilic polymer also include polyethylene terephthalates and polyethersulfones, which are obtained through polycondensation and which are hydrophilized by substituting hydrogen atoms in the main chain of the polyethylene terephthalates and polyethersulfones with hydrophilic groups. In the hydrophilized polyethylene terephthalates, polyethersulfones, and the like, hydrogen atoms in the main chain may be substituted by anionic groups or cationic groups, or the amount of the anionic groups and the amount of the cationic groups may be equal.

The water-insoluble hydrophilic polymer may be a polymer obtained by ring-opening an epoxy group in a bisphenol A type or novolak type epoxy resin, or by introducing a vinyl polymer, a polyethylene glycol, or the like in an epoxy group.

Moreover, the water-insoluble hydrophilic polymer may be subjected to silane coupling.

The water-insoluble hydrophilic polymers may be used singly or in mixtures of two or more.

As the water-insoluble hydrophilic polymer, homopolymers of hydroxyethyl methacrylate, hydroxypropyl methacrylate, or dihydroxyethyl methacrylate; and random copolymers of a hydrophilic monomer such as 3-sulfopropyl methacryloxyethyl dimethyl ammonium betaine, 2-methacryloyloxyethyl phosphorylcholine, or 1-carboxydimethyl methacryloyloxyethyl methane ammonium, and a hydrophobic monomer such as butyl methacrylate or ethylhexyl methacrylate are preferable from the viewpoint of easiness of production, and homopolymers of hydroxyethyl methacrylate or hydroxypropyl methacrylate; and random copolymers of a hydrophilic monomer such as 3-sulfopropyl methacryloxyethyl dimethyl ammonium betaine or 2-methacryloyloxyethyl phosphorylcholine, and a hydrophobic monomer such as butyl methacrylate or ethylhexyl methacrylate are more preferable from the viewpoint of easiness of selection of a solvent for a coating liquid, dispersibility in the coating liquid, and operability in conducting coating with the water-insoluble hydrophilic polymer.

The water-insoluble hydrophilic polymer obtained by insolubilizing a water-soluble hydrophilic polymer to water in the process of producing a membrane may be, for example, a water-soluble hydrophilic polymer that is insolubilized to water in such a way that a base material membrane of a hydrophobic polymer is coated with a water-soluble hydrophilic polymer obtained by copolymerizing a monomer having an azido group in a side chain thereof and a hydrophilic monomer such as 2-methacryloyloxyethyl phosphorylcholine and thereafter the resultant base material membrane is subjected to heat treatment, thereby covalently bonding the water-soluble hydrophilic polymer to the base material membrane. Moreover, a hydrophilic monomer such as a 2-hydroxyalkyl acrylate may also be graft-polymerized to a base material membrane of a hydrophobic polymer.

The porous membrane according to the present embodiments or the base material membrane in the present embodiments may be a membrane obtained by subjecting a hydrophilic polymer and a hydrophobic polymer to blend membrane-forming.

The hydrophilic polymer for use in blend membrane-forming is not particularly limited as long as the hydrophilic polymer is compatible with a good solvent together with a hydrophobic polymer, but copolymers containing a polyvinylpyrrolidone or vinylpyrrolidone are preferable as the hydrophilic polymer.

Specific examples of the polyvinylpyrrolidone include LUVITEC (trade name) K 60, K 80, K 85, and K 90, all commercially available from BASF SE, and LUVITEC (trade name) K 80, K 85, and K 90 are preferable.

As the copolymer containing vinylpyrrolidone, copolymers of vinylpyrrolidone and vinyl acetate are preferable in view of compatibility with hydrophobic polymers and suppression of interaction of protein to the membrane surface.

It is preferable that the copolymerization ratio of vinylpyrrolidone to vinyl acetate is 6:4 to 9:1 from the viewpoint of adsorption of protein to the membrane surface and interaction of protein with polysulfone-based polymers in the membrane.

Specific examples of the copolymer of vinylpyrrolidone and vinyl acetate include LUVISKOL (trade name) VA 64 and VA 73, all commercially available from BASF SE.

The hydrophilic polymers may be used singly or in mixtures of two or more.

In the present embodiments, washing with hot water after blend membrane-forming process is preferable in the case where a water-soluble hydrophilic polymer is used in blend membrane-forming from the viewpoint of suppressing elution of foreign materials from the membrane during filtration. As a result of washing, hydrophilic polymers which are insufficiently entangled with hydrophobic polymers are removed from the membrane and the elution during filtration is suppressed.

As the washing with hot water, hot-water treatment at a high pressure or warm water treatment after coating may be conducted.

The porous membrane according to the present embodiments has a dense layer in the downstream portion of filtration in the membrane.

Examples of the form of the porous membrane in the present embodiments include hollow fiber membranes and flat membranes.

In considering the intended purposes of the porous membrane as a separation/filtration membrane, the porous membrane is used in such a way that the upstream portion of filtration in the membrane has a coarse structure and the downstream portion of filtration in the membrane has a dense structure in the present embodiments.

In the case where a filtration solution is fed into a porous hollow fiber membrane, when the solution is fed on the outer surface side, the inner surface portion is the downstream portion of filtration, and when the solution is fed on the inner surface side, the outer surface portion is the downstream portion of filtration.

In a flat porous membrane, the membrane surface portion on one side is the upstream portion of filtration of the membrane, and the membrane surface portion on the other side is the downstream portion of filtration, but, in the flat membrane, liquid is fed from the membrane surface portion having a coarse structure to the membrane surface portion having a dense structure.

In the present embodiments, the downstream portion of filtration denotes a range that reaches 10% of the membrane thickness from the downstream surface of filtration corresponding to the membrane surface on one side, and the upstream portion of filtration corresponding to the membrane surface on the other side denotes a range that reaches 10% of the membrane thickness from the upstream surface of filtration.

In the porous hollow fiber membrane, when liquid is fed on the outer surface side, the range that reaches 10% of the membrane thickness from the inner surface is the downstream portion of filtration and the range that reaches 10% of the membrane thickness from the outer surface is the upstream portion of filtration, and when liquid is fed on the inner surface side, the range that reaches 10% of the membrane thickness from the inner surface is the upstream portion of filtration and the range that reaches 10% of the membrane thickness from the outer surface is the downstream portion of filtration.

The porous membrane according to the present embodiments has a dense layer in the downstream portion of filtration in the membrane, and a gradient asymmetric structure in which the average pore diameter of fine pores increases from the downstream portion of filtration in the membrane toward the upstream portion of filtration, and a gradient index of the average pore diameter from the dense layer to the coarse layer of 0.5 to 12.0.

In the present embodiments, the dense layer and coarse layer of the porous membrane are determined by taking images of the cross-sectional surface of a membrane with a scanning electron microscope (SEM). For example, a visual field is set horizontally to the membrane thickness direction at an arbitrary portion of the cross-sectional surface of the membrane with 50,000 magnifications. After taking the image of the one visual field that is set, the visual field for taking an image is moved horizontally to the membrane thickness direction and then the image of the next visual field is taken. By repeating the operation of taking an image, photographs of the cross-sectional surface of the membrane are taken without any space, and the photographs thus obtained are connected to obtain one photograph of the cross-sectional surface of the membrane. In this photograph of the cross-sectional surface, the average pore diameter in a range of (2 μm in a perpendicular direction to the membrane thickness direction)×(1 μm from the downstream surface of filtration toward the upstream surface side of filtration in the membrane thickness direction) is calculated every one micrometer from the downstream surface of filtration toward the upstream surface side of filtration.

The average pore diameter is calculated by a method using image analysis. Specifically, pore portions and solid portions are subjected to binarization with Image-pro plus manufactured by Media Cybernetics, Inc. The pore portions and the solid portions are discriminated based on brightness, the sections that cannot be discriminated or noise is corrected with a free-hand tool. An edge section that forms a contour of a pore portion and a porous structure observed in the back of a pore portion are discriminated as a pore portion. After the binarization, a pore diameter is calculated from a value of an area per one pore assuming that the shape of the pore is a perfect circle. The calculation is conducted for every pore to calculate an average pore diameter every 1 μm×2 μm range. It is to be noted that discontinuous pore portions at the ends of the visual fields are also counted.

The porous membrane according to the present embodiments has a dense layer and a coarse layer.

A visual field having an average pore diameter of 50 nm or smaller is defined as a dense layer, and a visual field having an average pore diameter of larger than 50 nm is defined as a coarse layer. FIG. 1 shows a result obtained by binarizing a specific SEM image.

Having a gradient asymmetric structure in which the average pore diameter of fine pores increases from the downstream portion of filtration in the membrane toward the upstream portion of filtration means that the average pore diameter of fine pores increases from the region where the average pore diameter is the smallest in the downstream portion of filtration toward the region where the average pore diameter is the largest in the upstream portion of filtration. In the present embodiments, the gradient asymmetric structure can be confirmed from digitization by calculating the average pore diameters from the analysis of the SEM images.

In the case where the porous membrane is a porous hollow fiber membrane in the present embodiments, there is a case where the porous hollow fiber membrane has a coarse layer in the inner surface portion and has a dense layer in the outer surface portion, or there is a case where the porous hollow fiber membrane has a coarse layer in the outer surface portion and has a dense layer in the inner surface portion. In the case where the porous hollow fiber membrane has a coarse layer in the inner surface portion and has a dense layer in the outer surface portion, the inner surface portion is the upstream portion of filtration and the outer surface portion is the downstream portion of filtration. In the case where the porous hollow fiber membrane has a coarse layer in the outer surface portion and has a dense layer in the inner surface portion, the outer surface portion is the upstream portion of filtration and the inner surface portion is the downstream portion of filtration.

The gradient index of the average pore diameter from the dense layer to the coarse layer is calculated based on the first visual field as defined as a dense layer and the second visual field as defined as a coarse layer, the second visual field being adjacent to the first visual field. A place appears where a visual field is transferred from a visual field having an average pore diameter of 50 nm or smaller, the visual field defined as a dense layer, to a visual field having an average pore diameter of larger than 50 nm, the visual field defined as a coarse layer. The gradient index is calculated using the adjacent visual fields of a dense layer and a coarse layer. Specifically, the gradient index of the average pore diameter from a dense layer to a coarse layer can be calculated from expression (1) given below.

Gradient index of average pore diameter from dense layer to coarse layer=(average pore diameter of coarse layer (first visual field)−average pore diameter of dense layer (second visual field))/1 (1)

In the porous membrane according to the present embodiments, it is preferable that the existence ratio (%) of fine pores of 10 nm or smaller in the dense layer is 8.0% or less, and more preferably 5.0% or less.

The existence ratio (%) of fine pores of 10 nm or smaller in the dense layer refers to the average of the values calculated from the analysis of the SEM images using expression (2) given below for all of the visual fields defined as the dense layer.

(Total number of fine pores having pore diameter of 10 nm or smaller in one visual field defined as dense layer/total number of fine pores in same visual field)×100 (2)

In the porous membrane according to the present embodiments, it is preferable that the existence ratio (%) of fine pores of larger than 10 nm and 20 nm or smaller in the dense layer is 20.0% or more and 35.0% or less.

The existence ratio (%) of fine pores of larger than 10 nm and 20 nm or smaller in the dense layer refers to the average of the values calculated from the analysis of the SEM images using expression (3) given below for all of the visual fields defined as the dense layer.

(Total number of fine pores having pore diameter of larger than 10 nm and 20 nm or smaller in one visual field defined as dense layer/total number of fine pores in same visual field)×100 (3)

In the porous membrane according to the present embodiments, it is preferable that the porosity (%) in the dense layer is 30.0% or more and 45.0% or less. The porosity (%) in the dense layer refers to the average of the values calculated from the analysis of the SEM images using expression (4) given below for all of the visual fields defined as the dense layer.

(Total area of pores in one visual field defined as dense layer/area of same visual field)×100 (4)

In the porous membrane according to the present embodiments, it is preferable that the value of the standard deviation of pore diameters/the average pore diameter in the dense layer is 0.85 or less, and more preferably 0.70 or less.

The value of the standard deviation of pore diameters/the average pore diameter in the dense layer refers to the average of the values calculated from the analysis of the SEM images using expression (5) given below for all of the visual fields defined as the dense layer.

Standard deviation of pore diameters calculated for one visual field defined as dense layer/average pore diameter in same visual field (5)

The virus removal mechanism in a virus removal membrane is considered to be as follows. A solution containing a virus permeates through a virus removal layer in which a plurality of virus capturing planes each being perpendicular to the permeation direction are stacked. The distribution always exists in the pore size of the virus capturing planes, and a virus is captured at a pore having the size smaller than the virus. In this case, the virus capturing ratio is low in one plane, but when a plurality of planes are stacked, a high virus removability is achieved. For example, even though the virus capturing ratio is 20% in one plane, when 50 layers of the planes are stacked, the whole virus capturing ratio becomes 99.999%. Many viruses are captured in a region where the average pore diameter is 50 nm or smaller.

The flux that means a permeation speed of a filtration solution is dominated by a speed at which a solution permeates through the dense layer where the pore diameters are the smallest in the membrane. By suppressing the occurrence of blocking of pores in the dense layer, lowering of the flux with time during filtration can be suppressed. Suppressing the lowering of the flux with time during filtration leads to an efficient protein recovery.

The molecular size of immunoglobulin being a physiologically active substance as the main object of filtration is about 10 nm, and the size of parvovirus is about 20 nm. An immunoglobulin solution being a filtration solution that is to be fed to the porous membrane contains contaminants such as an aggregates of immunoglobulins in an amount much larger than the amount of viruses.

It is empirically known that when the amount of the contaminants in a protein solution becomes large even slightly, the flux is remarkably lowered. Blocking of the pores in the dense layer due to the contaminants is one of the causes of the lowering of the flux with time. In order to suppress the blocking of the pores in the dense layer due to the contaminants, it becomes important not to allow the contaminants to permeate through the dense layer, and therefore it is preferable to capture the contaminants in the coarse layer before the protein solution permeates through the dense layer.

In order to capture the contaminants in the coarse layer as much as possible, it is preferred to make the capture volume of the contaminants in the coarse layer large. The pore diameter distribution also exists in a permeation plane in the coarse layer, and therefore when the gradient of the average pore diameter from the dense layer to the coarse layer is gentle, the number of planes that can capture the contaminants increases, resulting in an increase of a region that can capture the contaminants as a layer.

It becomes important to make the gradient of the average pore diameter from the dense layer to the coarse layer gentle in order to suppress the lowering of the flux caused by blocking of the pores in the dense layer due to the contaminants. In order to capture the contaminants effectively in the coarse layer immediately before the dense layer, it is preferable that the gradient index of the average pore diameter from the dense layer to the coarse layer is 0.5 to 12.0, more preferably 2.0 to 12.0, and still more preferably 2.0 to 10.0.

The porous membrane according to the present embodiments, as another illustrative embodiment, contains: a hydrophobic polymer; and a water-insoluble hydrophilic polymer, the porous membrane having: a dense layer in a downstream portion of filtration in the membrane; a gradient asymmetric structure in which an average pore diameter of fine pores increases from the downstream portion of filtration toward the upstream portion of filtration; an integrated permeability of immunoglobulin solution for 180 minutes of 8.0 to 20.0 kg/m$^2$ when 1.5% by mass of the immunoglobulin is filtered at a constant pressure of 2.0 bar; and a ratio of immunoglobulin flux F180 at 180 minutes after starting filtration to immunoglobulin flux F60 at 60 minutes after starting filtration of 0.70 or more.

In the present embodiments, protein can be recovered in a highly efficient manner with the porous membrane which enables operations at high filtration pressures and which suppresses the lowering of the flux with time during filtration.

Moreover, with the porous membrane according to the present embodiments, protein can be recovered in a more highly efficient manner due to the high pure water permeation rate.

In the present embodiments, use of the hydrophobic polymer as a base material, the hydrophobic polymer having pressure resistance, enables operations at high filtration pressures.

Furthermore, in the present embodiments, when 1.5% by mass of immunoglobulin is filtered at a constant pressure of 2.0 bar from the inner surface side to the outer surface side of the membrane, the ratio of immunoglobulin flux F180 at 180 minutes after starting filtration to immunoglobulin flux F60 at 60 minutes after starting filtration is 0.70 or more, thereby enabling a high permeability of protein with time, and the integrated permeability of immunoglobulin for 180 minutes becomes from 8.0 to 20.0 kg/m$^2$, thereby enabling the protein recovery in a highly efficient manner.

In purification processes of fractionated plasma products and biopharmaceutical with a membrane, filtration is generally conducted for 1 hour or longer, or may be conducted for 3 hours or longer. In order to recover protein in a highly efficient manner, it is important that the flux not be lowered for a long time. However, there is a general tendency that when protein is filtered, the flux is lowered with time and the amount of a filtrate recovered is lowered. This is considered to be attributable to the clogging (blocking) of pores with time during filtration. An increase in the number of blocked pores with time results in reduction in the number of pores which can capture viruses in the membrane. Accordingly, when the flux is lowered with time, it is considered that a risk that the virus removability is lowered with time due to blocking of pores arises even though the initial virus removability is high.

Thus, in the present embodiments, when 1.5% by mass of immunoglobulin is filtered at a constant pressure of 2.0 bar, the ratio of immunoglobulin flux F180 at 180 minutes after starting filtration to immunoglobulin flux F60 at 60 minutes after starting filtration is 0.70 or more, thereby enabling suppression of the lowering of the flux with time, realizing the protein recovery in a highly efficient manner, and leading to exhibition of sustainable virus removability, and therefore a protein-treating membrane that exhibits performance sufficient for removing viruses, etc. contaminated in a solution can be prepared.

In the present embodiments, a protein-treating membrane that achieves both the protein recovery in a highly efficient manner and the sustainable virus removability can be prepared by suppressing the lowering of the flux in a later stage of filtration in a virus removal membrane.

In the present embodiments, the ratio of immunoglobulin flux F180 at 180 minutes after starting filtration to immunoglobulin flux F60 at 60 minutes after starting filtration means F180/F60 being a ratio of the amount of a filtrate recovered from 40 minutes to 60 minutes to the amount of a filtrate recovered from 160 minutes to 180 minutes when 1.5% by mass of immunoglobulin is filtered at a constant pressure of 2.0 bar from the inner surface side to the outer surface side of the membrane and the filtrate is recovered every 20 minute.

In the present embodiments, when 1.5% by mass of immunoglobulin is filtered at a constant pressure of 2.0 bar, the integrated permeability of immunoglobulin for 180 minutes and the ratio of immunoglobulin flux F180 at 180 minutes after starting filtration to immunoglobulin flux F60 at 60 minutes after starting filtration are measured according to the method described as "Filtration Test of Immunoglobulin" in Examples.

The pure water permeation rate is also a standard for the flux being the filtration speed of a protein solution. The filtration speed of a protein solution becomes higher as the pure water permeation rate becomes higher although the filtration speed of the protein solution is lower than the pure water permeation rate because the solution viscosity of the protein solution is higher than the viscosity of pure water. Thus, in the present embodiments, a protein-treating membrane that can realize the protein recovery in a more highly efficient manner can be prepared by making the pure water permeation rate high.

It is preferable that the pure water permeation rate of the protein-treating membrane according to the present embodiments is 160 to 500 L/hr·m$^2$·bar.

When the pure water permeation rate is 160 L/hr·m$^2$·bar or more, the protein recovery in a highly efficient manner can be realized. Moreover, when the pure water permeation rate is 500 L/hr·m$^2$·bar or less, a sustainable virus removability can be exhibited.

In the present embodiments, the pure water permeation rate is measured according to the method described as "Measurement of Pure water permeation Rate" in Examples.

In the present embodiments, when the porous membrane has a gradient asymmetric structure, the flux can be made high in the case where the porous membrane is used for protein treatment.

Moreover, in the present embodiments, blocking of pores in the dense layer due to immunoglobulin monomers contained in the largest amount in a filtration solution is also one of the causes of the lowering of the flux with time. Accordingly, in order to prevent the lowering of the flux, it becomes important to reduce the ratio of the number of pores of 10 nm or smaller which can be a cause of blocking due to immunoglobulin monomers. However, when the ratio of the pores of 10 nm or smaller is reduced simply by making the average pore diameter large, the thickness of the dense layer becomes thin and therefore the virus removability is lowered. In order to reduce the ratio of the pores of 10 nm or smaller while maintaining the virus removability, it becomes important to reduce the ratio of pores of 10 nm or smaller in the dense layer by controlling the pore diameter distribution in the dense layer where the average pore diameter is 50 nm or smaller. According to studies conducted by the present inventors, in order to realize the suppression of blocking of pores due to the monomers and the protein recovery in a highly efficient manner while maintaining the virus removability, it is preferable to make the existence ratio of pores of 10 nm or smaller 8.0% or less, and more preferably 5.0% or less. It is preferable that the existence ratio of pores of larger than 10 nm and 20 nm or smaller in the dense layer is 20.0% or more and 35% or less from the viewpoint of virus removability.

The pure water permeation rate is a standard for the flux being the filtration speed of a protein solution. The filtration speed of a protein solution becomes higher as the pure water permeation rate becomes higher although the filtration speed of the protein solution is lower than the pure water permeation rate because the solution viscosity of the protein solution is higher than the viscosity of pure water. In the present embodiments, a membrane that can realize the protein recovery in a more highly efficient manner can be prepared by making the pure water permeation rate high. In order to realize a high-water-permeable performance together with pressure resistance, it is preferable to set the porosity in the dense layer to 30.0% or more and 50.0% or less. When the porosity is 30.0% or more, the protein recovery in a highly efficient manner can be realized. Moreover, an increase of the porosity in the dense layer means an increase of the total number of pores in the dense layer, resulting in an increase of the amount of viruses captured per virus capturing layer, and therefore sustainable virus removability can be exhibited. Further, when the porosity is 45.0% or less, operations at high filtration pressures can be conducted.

Furthermore, in order to realize the protein recovery in a highly efficient manner while maintaining the virus removability, it is also important that the standard deviation of pore diameters/the average pore diameter in the dense layer be small. When a large number of excessively large pores exist, the virus removability is lowered, and when a large number of excessively small pores exist, an efficient protein recovery cannot be conducted. That the standard deviation of pore diameters/the average pore diameter in the dense layer is small means that the number of existing excessively large pores and the number of existing excessively small pores are small. According to studies conducted by the present inventors, in order to realize the suppression of blocking of pores due to monomers in the dense layer and the protein recovery in a highly efficient manner while maintaining the virus capturing capability, it is preferable that the standard deviation of pore diameters/the average pore diameter in the dense layer is 0.85 or less, and more preferably 0.70 or less.

As described above, a virus is mainly captured in a region where the average pore diameter is 50 nm or smaller in a virus removal membrane, and therefore, in order to enhance the virus removability, it is preferable to make the dense layer thick. However, when the dense layer is made thick, the flux of protein is lowered. In order to recover protein in a highly efficient manner, it is preferable that the thickness of the dense layer is 1 to 8 μm, and more preferably 2 to 6 μm.

In the present embodiments, in order to provide a porous membrane with which a useful component can be recovered in a highly efficient manner while suppressing the clogging during filtration of a protein solution in purification processes of fractionated plasma products and biopharmaceutical, and from which only a small amount of an eluate is eluted even when an aqueous solution is filtered, it is preferable that (1) operations can be conducted at high filtration pressures, (2) when a protein solution is filtered, the lowering of the flux with time is suppressed, and the amount of protein recovered is large, (3) the pure water permeation rate is high, and (4) the membrane is constituted from a water-insoluble hydrophilized material.

(1) Operations at high filtration pressures can be realized by using, as a base material, a hydrophobic polymer having pressure resistance.

(2) Filtration in purification processes of fractionated plasma products and biopharmaceutical is generally conducted for 1 hour or longer. In order to suppress the lowering of the flux with time when a protein solution is filtered, the ratio of the flux after 180 minutes from starting filtration to the flux after 60 minutes from starting filtration may be considered. Moreover, as the protein, globulin may be used as an object of filtration because the globulin is most frequently filtered with a virus removal membrane.

In considering the concentration of the immunoglobulin at the time of filtering, it is preferable to set the concentration to 1.5% by mass because there is a tendency that the concentration of the immunoglobulin solution has been increasing in recent years for the purpose of improving production efficiency. Moreover, in considering the filtration pressure, when the filtration is conducted at a high pressure, the flux becomes high and recovery of the immunoglobulin in a highly efficient manner can be conducted, but it is preferable to set the filtration pressure to 2.0 bar from the viewpoint of maintaining the sealability of the filtration system.

In the present embodiments, it is preferable that the ratio of the flux (F180) after 180 minutes from starting filtration to the flux (F60) after 60 minutes from starting filtration, F180/F60, is 0.70 or more.

Further, in the present embodiments, when 1.5% by mass of immunoglobulin is filtered at a constant pressure of 2.0 bar, the integrated permeability of immunoglobulin at 180 minutes is 8.0 to 20.0 kg/m$^2$, and therefore the protein recovery in a highly efficient manner can be conducted.

(3) The pure water permeation rate is a standard for the flux being the filtration speed of a protein solution. The filtration speed of a protein solution becomes higher as the pure water permeation rate becomes higher although the filtration speed of the protein solution is lower than the pure water permeation rate because the solution viscosity of the protein solution is higher than the viscosity of pure water.

It is preferable that the pure water permeation rate of the porous membrane is 160 to 500 L/hr·m$^2$·bar. It is preferable that the pure water permeation rate is 160 L/hr·m$^2$·bar in view of the protein recovery in a highly efficient manner, and it is preferable that the pure water permeation rate is 500 L/hr·m$^2$·bar from the viewpoint of the virus removability and pore diameter.

(4) That the membrane is constituted from a hydrophobic polymer that is hydrophilized by a water-insoluble hydrophilic polymer can be realized by the above-described method.

In purification processes of fractionated plasma products and biopharmaceutical with a membrane, filtration is generally conducted for 1 hour or longer, or may be conducted for 3 hours or longer. In order to recover protein in a highly efficient manner, it is important that the flux not be lowered for a long time. That is to say, there is a general tendency that when protein is filtered, the flux is lowered with time and the amount of a filtrate recovered is lowered. This is considered to be attributable to a decrease in the number of pores capable of capturing a virus in the membrane caused by an increase in the number of blocked pores due to the occurrence of clogging (blocking) of pores with time during filtration. Accordingly, when the flux is lowered with time, there arises a risk that the accumulated amount of a filtrate recovered decreases and the virus removability is lowered due to blocking of pores with time even though the initial virus removability is high.

According to the porous membrane of the present embodiments, the lowering of the flux with time can be suppressed and both of the protein recovery in a highly efficient manner and the sustainable virus removability can be achieved.

In the present embodiments, the bubble point (BP) means a pressure at which a bubble is generated from the downstream surface side of filtration when pressure is being applied with air from the upstream surface of filtration in the membrane immersed with hexafluoroethylene. When the air permeates through the membrane immersed with a solvent, the air permeates through a pore at a higher applied pressure as the diameter of the pore is smaller. The maximum pore diameter of a membrane can be evaluated by evaluating the pressure when the air permeates for the first time.

The relation between the bubble point and the maximum pore diameter is given below in expression (6).

$$D_{BP}=4\gamma \cdot \cos \theta /BP \qquad (6)$$

where $D_{BP}$ represents the maximum diameter, $\gamma$ represents a surface tension (N/m) of a solvent, $\cos \theta$ represents a contact angle (−) between the solvent and the membrane, and BP represents a bubble point (MPa).

It is preferable that a parvovirus clearance of the porous membrane is 4 or more, and more preferably 5 or more in the case where the porous membrane is used as a virus removal membrane. It is preferable that the parvovirus is porcine parvovirus (PPV) from the viewpoint of similarity to viruses contaminated in the actual purification process and easiness of operation.

The maximum pore diameter of the membrane relates to the LRV, and the virus removability becomes higher as the bubble point becomes higher, but, in order to allow the virus removability to exhibit while maintaining permeability of protein being a useful component, or from the viewpoint of controlling the pure water permeation rate, it is preferable that the bubble point is 1.40 to 1.80, more preferably 1.50 to 1.80, and still more preferably 1.60 to 1.80.

In the present embodiments, the bubble point is measured according to the method described as "Measurement of Bubble Point" in Examples.

The parvovirus clearance is determined from the following experiment.

(1) Preparation of Filtration Solution

A solution is prepared using Venoglobulin IH 5% I.V. (2.5 g/50 ml) commercially available from Mitsubishi Tanabe Pharma Corporation so as to have an immunoglobulin concentration of 15 g/L, a sodium chloride concentration of 0.1 M, and a pH of 4.5. A solution obtained by spiking a 0.5% by volume of a porcine parvovirus (PPV) solution is used as a filtration solution.

(2) Sterilization of Membrane

A filter assembled so as to have an effective membrane area of 3.3 cm² is subjected to high-pressure steam sterilization treatment at 122° C. for 60 minutes.

(3) Filtration

The filtration solution prepared in (1) is subjected to dead-end filtration at a constant pressure of 2.0 bar for 180 minutes.

(4) Virus Clearance

The titer ($TCID_{50}$ value) of a filtrate obtained by filtering the filtration solution is measured by a virus assay. The virus clearance of the PPV is calculated from LRV=Log $[(TCID_{50})/mL$ (filtration solution)]−Log $[(TCID_{50})/mL$ (filtrate)].

In the present embodiments, the porous membrane is not particularly limited, and, for example, in the case where a porous hollow fiber membrane that is a porous membrane having a hollow fiber shape is used as the porous membrane, the porous hollow fiber membrane can be produced in the manner as described below. Hereinafter, description is made taking as an example a case where a polysulfone-based polymer is used as a hydrophobic polymer.

For example, a solution obtained by mixing and dissolving a polysulfone-based polymer, a solvent, and a non-solvent, and then degassing the resultant mixture is used as a dope. The dope is ejected simultaneously with a bore liquid from an orifice and a tube of a tube-in-orifice type spinneret respectively, and is introduced into a coagulation bath through an air gap portion to form a membrane. The obtained membrane is wound after washing with water, is subjected to removal of liquid in the hollow portion and then heat treatment, and is dried. Thereafter, the resultant membrane is subjected to hydrophilization treatment.

As the solvent for use in the dope, a wide range of solvents can be used as long as the solvent is a good solvent, such as N-methyl-2-pyrrolidone (NMP), N,N-dimethylformamide (DMF), N—N-dimethylacetoamide (DMAc), dimethyl sulfoxide, or ε-caprolactam, for polysulfone-based polymers, but amide-based solvents such as NMP, DMF, and DMAc are preferable, and NMP is more preferable.

It is preferable to add a non-solvent to the dope. Examples of the non-solvent for use in the dope include glycerin, water, and diol compounds, and the diol compounds are preferable.

The diol compound refers to a compound having a hydroxy group at both ends of the molecule, and as the diol compound, a compound which is represented by formula 3 given below and which has an ethylene glycol structure having a number of repeating unit n of 1 or more is preferable.

Examples of the diol compound include diethylene glycol (DEG), triethylene glycol (TriEG), tetraethylene glycol (TetraEG), and polyethylene glycols (PEGs) are preferable, and DEG, TriEG, and TetraEG are preferable, and TriEG is more preferable.

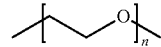

Formula 3

The detailed mechanism is not clear, but addition of the non-solvent into the dope increases the viscosity of the dope to suppress the diffusion rate of the solvent and non-solvent in the coagulation liquid, thereby making it easy to control coagulation and a preferable structure as a porous membrane, and therefore is suitable for forming a desired structure.

It is preferable that the ratio of solvent/non-solvent in the dope is 40/60 to 80/20 based on a mass ratio.

It is preferable that the concentration of the polysulfone-based polymer in the dope is 15 to 35% by mass, and more preferably 20 to 30% by mass in view of membrane strength and permeation performance.

The dope is obtained by dissolving a polysulfone-based polymer, a good solvent, and a non-solvent under stirring at a constant temperature. It is preferable that the temperature is higher than normal temperature and is 30 to 80° C. Tertiary or lower nitrogen-containing compounds (NMP, DMF, DMAc) are oxidized in the air, and the oxidation further easily progresses when the compounds are warmed, and therefore it is preferable that the dope is prepared in an inert gas atmosphere. Examples of the inert gas include nitrogen and argon, and nitrogen is preferable from the viewpoint of production costs.

It is preferable that the dope is degassed in view of prevention of fiber breakage during spinning and suppression of macrovoid formation after membrane-forming. A degassing process can be conducted in the manner as follows. The pressure of the inside of a tank containing a completely dissolved dope is reduced to 2 kPa, and the dope is left to stand for 1 hour or longer. The operation is repeated 7 times or more. The solution may be stirred during degassing in order to enhance deforming efficiency.

It is preferable that foreign materials is removed from the dope before being ejected from the spinneret. Removing the foreign materials can prevent fiber breakage during spinning and control the structure of the membrane. It is preferable to install a filter before the dope is ejected from the spinneret also for preventing the foreign materials from contaminating from a packing etc. Filters having different pore diameters may be installed in a multistage configuration, and is not particularly limited, for example, it is suitable to install a mesh filter having a pore diameter of 30 μm and a mesh filter having a pore diameter of 10 μm in this order from the position nearer to a tank for the dope.

As for the composition of the bore liquid for use in membrane-forming, it is preferable to use the same component as used in the good solvent for use in the dope or the coagulation liquid.

For example, when NMP is used as a solvent for the dope and NMP/water are used as a good solvent/a non-solvent for the coagulation liquid, it is preferable that the bore liquid is constituted from NMP and water.

When the amount of the solvents in the bore liquid becomes large, an effect of delaying the progress of coagulation to allow the membrane structure formation to progress slowly is exhibited, and when the amount of water becomes large, an effect of accelerating the progress of coagulation is exhibited. In order to facilitate the progress of coagulation appropriately to control the membrane structure, thereby obtaining a preferable membrane structure for a porous membrane, it is preferable that the ratio of good solvent/water in the bore liquid is 60/40 to 80/20 based on a mass ratio.

It is preferable that the temperature of the spinneret is 25 to 50° C. in order to obtain appropriate pore diameters.

The dope is introduced into the coagulation bath through the air gap portion after being ejected from the spinneret. It is preferable that the retention time in the air gap portion is 0.02 to 0.6 seconds. By setting the retention time to 0.02 seconds or longer, coagulation before introduction to the coagulation bath is made sufficient and the pore diameters can be made appropriate. By setting the retention time to 0.6 seconds or shorter, excessive progress of coagulation can be prevented, and precise control of the membrane structure in the coagulation bath can be achieved.

Moreover, it is preferable that the air gap portion is sealed. The detailed mechanism is not clear, but it is considered that, by sealing the air gap portion, a steam atmosphere of water and a good solvent is formed in the air gap portion to allow the phase separation to progress slowly before the dope is introduced into the coagulation bath, thereby suppressing formation of excessively small pores and making the CV value of pore diameters small.

The spinning rate is not particularly limited as long as the spinning rate satisfies the condition under which a membrane without a defect can be obtained, but in order to make a liquid exchange between the membrane and the coagulation bath in the coagulation bath slow and control the membrane structure, it is preferable that the spinning rate is slow as much as possible. Accordingly, the spinning rate is preferably 4 to 15 m/min from the viewpoint of productivity and solvent exchange.

A draft ratio refers to a ratio of a take-over speed to dope an ejection linear velocity of dope from the spinneret. A high draft ratio means that the draw ratio after the dope is ejected from the spinneret is high.

Generally, in the case where a membrane is formed using a wet phase separation method, the membrane structure is almost determined when a dope comes out of a coagulation bath through an air gap portion. The inside of the membrane is configured of solid portions formed by entanglement of polymer chains and pore portions where a polymer does not exist. The detailed mechanism is not clear, but when the membrane is excessively drawn before coagulation is completed, in other words, when the membrane is excessively drawn before the polymer chains become entangled, the entanglements of polymer chains are torn off, and pore portions are connected and, as a result, excessively large pores are formed, or pore portions are divided and, as a result, excessively small pores are formed. The excessively large pores become a cause of leakage of viruses, and the excessively small pores become a cause of clogging.

It is preferable that the draft ratio is made small as much as possible in view of structure control, and the draft ratio is preferably 1.1 to 6, and more preferably 1.1 to 4.

The dope passes through the filter and the spinneret, is moderately coagulated in the air gap portion, and is thereafter introduced into the coagulation liquid. The detailed mechanism is not clear, but it is considered that, by making the spinning rate slow, a fluid film formed at the interface between the outer surface of the membrane and the coagulation liquid becomes thick and the liquid exchange at this interface occurs slowly, thereby allowing coagulation to progress slowly as compared with the coagulation in the case where the spinning rate is fast, and therefore the gradient of the average pore diameter from the dense layer to the coarse layer becomes gentle.

The good solvent has an effect of delaying coagulation, water has an effect of accelerating coagulation, and therefore, in order to allow coagulation to progress at an appropriate speed to make the thickness of the dense layer adequate, thereby obtaining a membrane having a preferable pore diameter, it is preferable that the ratio of good solvent/water as the coagulation liquid composition is 50/50 to 5/95 based on a mass ratio. It is preferable that the temperature of the coagulation bath is 10 to 40° C. in view of pore diameter control.

The membrane pulled up from the coagulation bath is washed with warm water.

In the washing process with water, it is preferable to make sure to eliminate the good solvents and non-solvents. When the membrane is dried while containing a solvent, the solvent is concentrated in the membrane during drying and a polysulfone-based polymer is dissolved or swollen. As a result, there is a possibility that the membrane structure is changed.

In order to increase the diffusion rate of the solvents and non-solvents to be eliminated and increase washing efficiency with water, it is preferable that the temperature of the warm water is 50° C. or higher.

In order to conduct washing with water sufficiently, it is preferable that the retention time of the membrane in the bath for washing with water is 10 to 300 seconds.

The membrane pulled up from the bath for washing with water is wound to a winding frame with a winder. In this case, when the membrane is wound in the air, the membrane becomes gradually dried, and the membrane may shrink only slightly. In order to make the membrane structures same to prepare uniform membranes, it is preferable that the membranes are wound in water.

Both ends of the membrane wound to the winding frame are cut, and the membrane is then made into a bundle and is held by a support not to loosen. The membrane thus held is immersed and washed in hot water in a hot-water treatment process.

In the hollow portion of the membrane wound to the winding frame, a white-clouded liquid is left. In the liquid, polysulfone-based polymer particles having a size of nanometers to micrometers are suspended. When the membrane is dried without removing the white-clouded liquid, the particles may block the pores of the membrane to lower the membrane performance, and therefore it is preferable to eliminate liquid in the hollow portion.

In the hot-water treatment process, the membrane is also washed from inside, and the good solvents and non-solvents that have not been eliminated in the washing process with water are efficiently eliminated.

It is preferable that the temperature of hot water in the hot-water treatment process is 50 to 100° C. and the washing time is 30 to 120 minutes.

It is preferable that hot water is exchanged several times during washing.

It is preferable that the wound membrane is subjected to high-pressure hot-water treatment. Specifically, it is preferable that the membrane is placed in a high-pressure steam sterilizer in a state where the membrane is completely immersed in water, and is subjected to treatment for 2 to 6 hours at 120° C. or higher. The detailed mechanism is not clear, but not only the solvents and non-solvents slightly left in the membrane are completely eliminated but also the entanglements and state of existence of the polysulfone-based polymers in the dense layer region are optimized by the high-pressure hot-water treatment.

A base material membrane containing a polysulfone-based polymer is completed by drying the membrane subjected to high-pressure hot-water treatment. The drying method such as air drying, drying under reduced pressure, or hot-air drying is not particularly limited, but it is preferable that the membrane is dried in a state where both ends thereof are fixed so that the membrane does not shrink during drying.

The base material membrane becomes the porous membrane according to the present embodiments through a coating process.

For example, in the case where hydrophilization treatment is conducted by coating, the coating process includes: immersing process of immersing a base material membrane in a coating liquid; deliquoring process of deliquoring the immersed base material membrane; and drying process of drying the deliquored base material membrane.

In the immersing process, the base material membrane is immersed in a hydrophilic polymer solution. The solvent of the coating liquid is not particularly limited as long as the solvent is a good solvent for the hydrophilic polymer and is also a poor solvent for polysulfone-based polymers, but alcohols are preferable.

It is preferable that the concentration of the water-insoluble hydrophilic polymer in the coating liquid is 1.0% by mass or more from the viewpoint of suppressing the lowering of the flux with time due to the adsorption of protein during filtration by sufficiently coating the pore surface of the base material membrane with the hydrophilic polymer, and it is preferable that the concentration is 10.0% by mass or less from the viewpoint of preventing the lowering of the flux due to the excessively small pore diameter by coating the pore surface with an appropriate thickness.

It is preferable that the time for immersing the base material membrane in the coating liquid is 8 to 24 hours.

The base material membrane immersed in the coating liquid for a predetermined time is deliquored in the deliquoring process in which extra coating liquid adhered to the hollow portion and outer circumference of the membrane is deliquored by centrifugal operation. It is preferable to set the centrifugal force during centrifugal operation to 10 G or more and to set the time for centrifugal operation to 30 minutes or longer in view of preventing the membranes after drying from fixing one another due to the residual hydrophilic polymer.

The porous membrane according to the present embodiments can be obtained by drying the deliquored membrane. The drying method is not particularly limited, but vacuum drying is preferable because it is the most efficient method.

It is preferable that the inner diameter of the porous membrane is 200 to 400 µm and the membrane thickness is 30 to 80 µm because of ease of filter processing.

EXAMPLES

Hereinafter, the present invention will be described in detail with Examples, but the present invention is not limited to Examples below. Test methods shown in Examples are as follows.

(1) Measurement of Inner Diameter and Membrane Thickness

The inner diameter and membrane thickness of a porous membrane were determined by taking an image of a vertical fracture cross section of the porous membrane with a stereoscopic microscope. The membrane thickness was defined as (outer diameter-inner diameter)/2.

Moreover, the membrane area was calculated from the inner diameter and effective length of the membrane.

In Example 14, the membrane thickness was determined by taking an image of a vertical fracture cross section of the porous membrane with a stereoscopic microscope.

(2) Measurement of Gradient Asymmetric Structure and Measurement of Gradient Index of Average Pore Diameter from Dense Layer to Coarse Layer An image of a vertical fracture cross section of a porous membrane was taken by a SEM in such a way that a visual field was set horizontally to the membrane thickness direction in the vertical fracture cross section with 50,000 magnifications. After taking the image of the one visual field that was set, the visual field for taking an image was moved horizontally to the membrane thickness direction and then the image of the next visual field was taken. By repeating the operation of taking an image, photographs of the cross-sectional surface of the membrane were taken without any space, and the photographs thus obtained were connected to obtain one photograph of the cross-sectional surface of the membrane. In this photograph of the cross-sectional surface of the membrane, average pore diameter in a range of (2 μm in a perpendicular direction to the membrane thickness direction)×(1 μm from the downstream surface of filtration toward the upstream surface side of filtration in the membrane thickness direction) was calculated to digitize a gradient structure of the cross-sectional surface of the membrane every one micrometer from the downstream surface of filtration toward the upstream surface side of filtration.

The average pore diameter was calculated in the manner as described below.

Pore portions and solid portions were subjected to binarization with Image-pro plus manufactured by Media Cybernetics, Inc. in such a way that the pore portions and the solid portions were discriminated based on brightness, the sections that were not able to be discriminated or noise was corrected with a free-hand tool, and an edge section forming a contour of a pore portion and a porous structure observed in the back of a pore portion were discriminated as a pore portion. After the binarization, a pore diameter was calculated regarding continuous sections as one pore and assuming a value of an area of one pore to be a value of an area of a perfect circle. Discontinuous pore portions at the ends of the visual fields were counted, and the calculation was conducted for every pore to calculate an average pore diameter every 2 μm×1 μm range. A range where the average pore diameter was 50 nm or smaller was defined as a dense layer, and a range where the average pore diameter was larger than 50 nm was defined as a coarse layer.

In the case where evaluation was conducted moving from the downstream portion of filtration horizontally to the membrane thickness direction, the gradient index of the average pore diameter from the dense layer to the coarse layer was determined from adjacent dense layer and coarse layer with expression (1) given below for a place where a range is transferred from a range having an average pore diameter of 50 nm or smaller, the range defined as a dense layer, to a range having an average pore diameter of larger than 50 nm, the range defined as a coarse layer.

Gradient index of average pore diameter from dense layer to coarse layer=(average pore diameter of coarse layer average pore diameter of dense layer)/1 (1)

(3) Measurement of Existence Ratio of Pores of 10 nm or Smaller, Existence Ratio of Pores of Larger than 10 nm and 20 nm or Smaller, Porosity, and Value of Standard Deviation of Pore Diameters/Average Pore Diameter in Dense Layer The ratio of pores of 10 nm or smaller in a dense layer was determined from expression (2) given below.

Existence ratio of pores of 10 nm or smaller in dense layer=total number of pores of 10 nm or smaller in 2 μm×1 μm range defined as dense layer/total number of pores in same range×100 (2)

Ratio of pores of larger than 10 nm and 20 nm or smaller in dense layer=total number of pores of larger than 10 nm and 20 nm or smaller in 2 μm×1 μm range defined as dense layer/total number of pores in same range×100 (3)

Porosity in dense layer=total area of pores in 2 μm×1 μm range defined as dense layer/area of visual field (2 μm²) (4)

Value of standard deviation of pore diameters/average pore diameter in dense layer=standard deviation of pore diameters/average pore diameter in one visual field defined as dense layer (5)

(4) Thickness of Dense Layer

The thickness of a dense layer was determined as the number of ranges showing an average pore diameter of 50 nm or smaller×1 (μm).

(5) Measurement of Pure Water Permeation Rate

The amount of pure water of 25° C. filtered was measured by dead-end filtration at a constant pressure of 1.0 bar using a filter assembled so as to have an effective membrane area of 3.3 cm², and the pure water permeation rate was calculated from the filtration time.

(6) Measurement of Bubble Point

The downstream surface side of filtration of a membrane in a filter assembled so as to have an effective membrane area of 0.83 cm² was filled with hexafluoroethylene, the pressure was then increased with compressed air from the upstream side of filtration in a dead-end system, and the pressure when generation of a bubble was confirmed from the downstream surface side of filtration (when flow rate of air reached 2.4 mL/min) was determined as the bubble point.

(7) Filtration Test of Immunoglobulin

A filter assembled so as to have an effective membrane area of 3.3 cm² was subjected to high-pressure steam sterilization treatment at 122° C. for 60 minutes. A solution was prepared using Venoglobulin IH 5% I.V. (2.5 g/50 ml) commercially available from Mitsubishi Tanabe Pharma Corporation so as to have an immunoglobulin concentration of 15 g/L, a sodium chloride concentration of 0.1 M, and a pH of 4.5. The prepared solution was subjected to dead-end filtration at a constant pressure of 2.0 bar for 180 minutes.

The filtrate was then recovered with a 20-minute interval, and the ratio of the amount of the filtrate recovered from 160 minutes to 180 minutes to the amount of the filtrate recovered from 40 minutes to 60 minutes was determined to F180/F60.

Moreover, the integrated permeability of immunoglobulin for 180 minutes was calculated from the amount of the filtrate recovered for 180 minutes, the concentration of the immunoglobulin in the filtrate, and membrane area of the filter.

(8) Measurement of Porcine Parvovirus Clearance.

A solution obtained by spiking 0.5% by volume of a PPV solution to the solution prepared in (7) Filtration Test of Immunoglobulin was used as a filtration solution. The prepared filtration solution was subjected to dead-end filtration at a constant pressure of 2.0 bar for 180 minutes.

The titer ($TCID_{50}$ value) of the filtrate was measured by a virus assay. The virus clearance of the PPV was calculated from LRV=Log [($TCID_{50}$)/mL (filtration solution)]−Log [($TCID_{50}$)/mL (filtrate)].

(9) Evaluation of Elution

A filter prepared in the same method as in (7) was used for dead-end filtration at a constant pressure of 2.0 bar with 100 mL of pure water of 25° C., and the filtrate was recovered and concentrated. The amount of carbon was measured using the obtained concentrated liquid with a total organic carbon meter TOC-L (manufactured by Shimadzu Corporation) to calculate the elution ratio from a membrane.

Poly(hydroxyethyl methacrylate), poly [(2-methacryloyloxyethyl phosphorylcholine)-ran-(n-butyl methacrylate)], and a random copolymer of poly [(2-(N-3-sulfopropyl-N, N-dimethylammonium)ethyl methacrylate)-ran-(n-butyl methacrylate)] each used in Examples were synthesized using α,α-azobisisobutyronitrile (Kanto Chemical Co., Inc.) as an initiator through conventional radical polymerization.

Moreover, polystyrene-block-poly(ethylene glycol) was synthesized according to Biomaterials, vol. 20, p. 963 (1999).

Example 1

A solution obtained by mixing 24 parts by mass of PES (ULTRASON® E 6020 P manufactured by BASF SE), 36 parts by mass of NMP (manufactured by Kishida Chemical Co., Ltd.), and 40 parts by mass of TriEG (manufactured by Kanto Chemical Co., Inc.) at 35° C. and then repeating degassing 7 times under a reduced pressure of 2 kPa was used as a dope. The dope was ejected from an orifice of a tube-in-orifice type spinneret setting the temperature of a spinneret to 35° C. and a mixed liquid of 75 parts by mass of NMP and 25 parts by mass of water was ejected as a bore liquid from a tube. The ejected dope and bore liquid were introduced in a coagulation bath containing a coagulation liquid of 25 parts by mass of NMP and 75 parts by mass of water and having a temperature of 20° C. through a sealed air gap portion.

The membrane pulled out from the coagulation bath was travelled in a water washing tank set at a temperature of 55° C. by a Nelson roller, and then wound in water with a winding frame. The spinning rate was set to 5 m/min, and the draft ratio was set to 2.

The wound membrane was cut at both ends of the winding frame, made into a bundle and held by a support not to loosen. The membrane was then immersed in hot water of 80° C. and washed for 60 minutes. The washed membrane was subjected to high-pressure hot-water treatment under a condition of 128° C. for 3 hours, and thereafter dried in a vacuum to obtain a hollow fiber base material membrane.

The obtained hollow fiber base material membrane was immersed in a coating liquid containing 2.5 parts by mass of poly(hydroxyethyl methacrylate) (produced using hydroxyethyl methacrylate (manufactured by Kanto Chemical Co., Inc.)) having a weight average molecular weight of 80 kDa and 97.5 parts by mass of methanol for 24 hours, and was thereafter subjected to centrifugal deliquoring at 12.5 G for 30 minutes. After centrifugal deliquoring, the hollow fiber base material membrane was dried in a vacuum for 18 hours to obtain a hollow fiber porous membrane.

The measurement results (1) to (9) for the obtained porous membrane are shown in Table 1.

Example 2

A hollow fiber porous membrane was obtained in the same manner as in Example 1 except that the coagulation liquid composition was changed to 15 parts by mass of NMP and 85 parts by mass of water, and the temperature of the coagulation liquid was changed to 15° C.

Example 3

A hollow fiber porous membrane was obtained in the same manner as in Example 1 except that the coating liquid composition was changed to: 3.5 parts by mass of a random copolymer (molar fraction, MPC/BMA=3/7) of 2-methacryloyloxyethyl phosphorylcholine (MPC, manufactured by Tokyo Chemical Industry Co., Ltd.) and n-butyl methacrylate (BMA, Kanto Chemical Co., Inc.), the random copolymer having a weight average molecular weight of 80 kDa; and 96.5 parts by mass of methanol.

Example 4

A hollow fiber porous membrane was obtained in the same manner as in Example 1 except that the coating liquid composition was changed to: 3 parts by mass of a random copolymer (molar fraction, SPMA/BMA=3/7) of 2-(N-3-sulfopropyl-N, N-dimethylammonium)ethyl methacrylate (SPMA, manufactured by Sigma-Aldrich Co., LLC.) and BMA (Kanto Chemical Co., Inc.), the random copolymer having a weight average molecular weight of 90 kDa; and 97 parts by mass of methanol.

Example 5

A hollow fiber porous membrane was obtained in the same manner as in Example 1 except that the coating liquid composition was changed to 3 parts by mass of hydroxypropyl cellulose (manufactured by Nippon Soda Co., Ltd., trade name SSL) and 97 parts by mass of methanol to coat the base material membrane and thereafter the coated base material membrane was subjected to high-pressure steam sterilization treatment at 122° C. for 20 minutes.

Example 6

A hollow fiber porous membrane was obtained in the same manner as in Example 1 except that the coating liquid composition was changed to 2.5 parts by mass of polystyrene (3 kDa)-block-poly(ethylene glycol) (2 kDa) and 97.5 parts by mass of methanol.

Example 7

The base material membrane obtained in Example 1 was irradiated with γ-rays at 25 kGy, and then immersed in a solution containing 7 parts by mass of 2-hydroxypropyl acrylate (manufactured by Tokyo Chemical Industry Co., Ltd.), 25 parts by mass of t-butanol (manufactured by Kanto Chemical Co., Inc.), and 68 parts by mass of water and having a temperature of 50° C. to conduct graft polymerization for 1 hour. After the graft polymerization, the graft-polymerized product was washed with t-butanol of 50° C. to eliminate unreacted substances, and thereafter dried in a vacuum for 18 hours to obtain a hollow fiber porous membrane.

Example 8

A hollow fiber porous membrane was obtained in the same manner as in Example 1 except that the temperature of the coagulation bath was changed to 25° C.

Example 9

A hollow fiber porous membrane was obtained in the same manner as in Example 1 except that the temperature of the spinneret was changed to 40° C., the bore liquid composition was changed to 74 parts by mass of NMP and 26 parts by mass of water, the coagulation liquid composition was changed to 45 parts by mass of NMP and 55 parts by mass of water, and the temperature of the coagulation bath was changed to 18° C.

Example 10

A hollow fiber porous membrane was obtained in the same manner as in Example 1 except that the temperature of the spinneret was changed to 25° C., the bore liquid composition was changed to 73 parts by mass of NMP and 27 parts by mass of water, the coagulation bath composition was changed to 10 parts by mass of NMP and 90 parts by mass of water, and the temperature of the coagulation bath was changed to 15° C.

Example 11

A hollow fiber porous membrane was obtained in the same manner as in Example 1 except that the temperature of the coagulation bath was changed to 15° C.

Example 12

A hollow fiber porous membrane was obtained in the same manner as in Example 1 except that a membrane was formed in such a way that the dope composition was changed to 27 parts by mass of PES (ULTRASON® E 6020 P manufactured by BASF SE), 30.4 parts by mass of NMP (manufactured by Kishida Chemical Co., Ltd.), 33.6 parts by mass of TriEG (manufactured by Kanto Chemical Co., Inc.), and 9 parts by mass of a copolymer of vinylpyrrolidone and vinyl acetate (LUVISKOL® VA64 manufactured by BASF SE), the temperature of the spinneret was changed to 50° C., the bore liquid composition was changed to 45.1 parts by mass of NMP, 49.9 parts by mass of TriEG, and 5 parts by mass of water, the coagulation liquid composition was changed to 28.5 parts by mass of NMP, 31.5 parts by mass of TriEG, and 40 parts by mass of water, and the temperature of the coagulation liquid was changed to 30° C., the formed membrane was then immersed in 0.5 parts by mass of hydroxypropyl cellulose (SSL (trade name) manufactured by Nippon Soda Co., Ltd.), 20 parts by mass of 2-propanol (manufactured by Kanto Chemical Co., Inc.), and 79 parts by mass of water at 25° C., and then left to stand for 20 minutes after reducing pressure to −0.07 MPa, and thereafter, the membrane was taken out, the liquid in the hollow portion was eliminated, and the membrane was then immersed in water of 80° C. for 60 minutes.

Example 13

A hollow fiber porous membrane was obtained in the same manner as in Example 1 except that the dope composition was changed to 23 parts by mass of PVDF (SOFEF 1012 manufactured by SOLVAY S.A.), 37 parts by mass of NMP, and 40 parts by mass of TriEG, the bore liquid composition was changed to 73 parts by mass of NMP and 27 parts by mass of water, the temperature of the spinneret was changed to 40° C., the coagulation bath composition was changed to 10 parts by mass of NMP and 90 parts by mass of water, and the temperature of the coagulation bath was changed to 50° C.

Example 14

A solution obtained by mixing 22 parts by mass of PES (ULTRASON® E 6020 P manufactured by BASF SE), 33 parts by mass of NMP (manufactured by Kishida Chemical Co., Ltd.), and 45 parts by mass of TriEG (manufactured by Kanto Chemical Co., Inc.) at 35° C. and then repeating degassing under a reduced pressure of 2 kPa 7 times was used as a dope.

The dope was applied in a sheet form while the temperature thereof was controlled to 55° C. on a moving carrier with a pressurizing caster so as to have a membrane thickness of 80 μm. The ejection speed was set to 5 m/min, and the draft ratio was set to 2. The formed sheet was immersed for 10 minutes in a coagulation bath in which the coagulation bath composition was 5 parts by mass of NMP and 95 parts by mass of water and the coagulation temperature was set to 30° C. to be coagulated, and the resultant sheet was washed with water, dried in a vacuum to obtain a flat base material membrane.

The obtained flat base material membrane was immersed in a coating liquid containing 2.5 parts by mass of poly(hydroxyethyl methacrylate) (produced using hydroxyethyl methacrylate (manufactured by Kanto Chemical Co., Inc.)) having a weight average molecular weight of 80 kDa and 97.5 parts by mass of ethanol for 24 hours, and was thereafter subjected to centrifugal deliquoring at 12.5 G for 30 minutes. After the centrifugal deliquoring, the flat base material membrane was dried in a vacuum for 18 hours to obtain a flat porous membrane.

Comparative Example 1

A hollow fiber porous membrane was obtained in the same manner as in Example 1 except that the coagulation liquid composition was changed to 100 parts by mass of water.

The ratio of pores of 10 nm or smaller in the dense layer became large and clogging became liable to occur, and therefore an efficient protein recovery was not able to be conducted.

Comparative Example 2

A hollow fiber porous membrane was obtained in the same manner as in Example 1 except that the spinning rate was changed to 20 m/min and the draft ratio was changed to 10.

By changing the spinning rate and the draft ratio to be higher, the ratio of pores of 10 nm or smaller in the dense layer became large, and therefore clogging became liable to occur, and moreover, by changing the draft ratio to be higher, pin holes were produced in the membrane, and therefore the parvovirus removability was lowered.

Comparative Example 3

A hollow fiber porous membrane was obtained in the same manner as in Example 1 except that the coating liquid composition was changed to 4 parts by mass of Tetronic 1307 (manufactured by BASF SE) and 96 parts by mass of methanol.

Because the hydrophilic polymer was water-soluble, elution of the hydrophilic polymer was confirmed after water filtration. Moreover, filtration for 180 minutes was not able to be completed due to adsorption of protein to the membrane.

Comparative Example 4

A hollow fiber porous membrane was obtained in the same manner as in Example 1 except that the coating liquid composition was changed to 3.5 parts by mass of a copolymer (molar fraction, SPM/BMA=3/7) of sulfopropyl methacrylate (SPM) and BMA, the copolymer having a weight average molecular weight of 80 kDa, and 96.5 parts by mass of methanol.

Filtration for 180 minutes was not able to be completed due to adsorption of protein to the membrane.

Results of Measurement (1) to (9) for the porous membranes obtained in Examples 1 to 14 and Comparative Examples 1 to 4 are shown in Table 1 and Table 2.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Inner diameter (μm) | 325 | 328 | 325 | 325 | 325 | 325 | 325 | 331 | 321 |
| Membrane thickness (μm) | 65 | 64 | 65 | 65 | 65 | 65 | 65 | 63 | 62 |
| Gradient index of average pore diameter from dense layer to coarse layer | 7.5 | 10.1 | 7.4 | 7.5 | 7.8 | 7.5 | 7.4 | 6.1 | 0.9 |
| Existence ratio (%) of pores of 10 nm or smaller in dense layer (%) | 3.4 | 7.6 | 3.4 | 3.4 | 3.4 | 3.4 | 3.9 | 2.8 | 3.1 |
| Existence ratio (%) of pores of larger than 10 nm and 20 nm or smaller in dense layer (%) | 25.2 | 26.3 | 25.3 | 25 | 25.4 | 25.1 | 25.3 | 27.1 | 28.3 |
| Value of standard deviation of pore diameters/average pore diameter in dense layer | 0.69 | 0.83 | 0.7 | 0.68 | 0.68 | 0.68 | 0.69 | 0.79 | 0.82 |
| Porosity (%) in dense layer (%) | 35.8 | 36 | 35.8 | 36.1 | 36.2 | 35.7 | 35.1 | 36 | 37.5 |
| Thickness of dense layer (μm) | 4 | 3 | 4 | 4 | 4 | 4 | 4 | 4 | 7 |
| Pure water permeation rate (L/hr · m² · bar) | 320 | 235 | 350 | 348 | 365 | 336 | 263 | 430 | 211 |
| Bubble point (MPa) | 1.65 | 1.76 | 1.61 | 1.62 | 1.61 | 1.63 | 1.72 | 1.47 | 1.54 |
| $F_{180}/F_{60}$ | 0.82 | 0.72 | 0.78 | 0.76 | 0.73 | 0.71 | 0.81 | 0.81 | 0.77 |
| Integrated permeability of immunoglobulin for 180 minutes (kg/m²) | 15.2 | 8.7 | 16.5 | 15.9 | 14.5 | 12.9 | 12 | 19.9 | 9.3 |
| LRV | 5 or more | 5 or more | 5 or more | 5 or more | 5 or more | 5 or more | 5 or more | 4.5 | 5 or more |
| Elution ratio (%) | — | — | — | — | — | — | — | — | — |

TABLE 2

|  | Example 10 | Example 11 | Example 12 | Example 13 | Example 14 | Comparative Example 1 | Comparative Example 2 | Comparative Example 3 | Comparative Example 4 |
|---|---|---|---|---|---|---|---|---|---|
| Inner diameter (μm) | 319 | 334 | 220 | 270 | — | 332 | 311 | 325 | 325 |
| Membrane thickness (μm) | 60 | 64 | 55 | 40 | 80 | 68 | 59 | 65 | 65 |
| Gradient index of average pore diameter from dense layer to coarse layer | 11.7 | 8.9 | 4.8 | 6.7 | 10.0 | 16.5 | 14.2 | 7.4 | 7.3 |
| Existence ratio (%) of pores of 10 nm or smaller in dense layer (%) | 6.9 | 5.1 | 7.8 | 5.5 | 7.9 | 6.2 | 9.1 | 3.4 | 3.6 |
| Existence ratio (%) of pores of larger than 10 nm and 20 nm or smaller in dense layer (%) | 25.9 | 25.9 | 28.3 | 27 | 26.3 | 32.3 | 22 | 25.4 | 25.4 |
| Value of standard deviation of pore diameters/average pore diameter in dense layer | 0.8 | 0.75 | 0.81 | 0.8 | 0.83 | 0.76 | 1.2 | 0.69 | 0.7 |
| Porosity (%) in dense layer (%) | 33.9 | 36.3 | 32.5 | 38.7 | 35.8 | 29 | 36.2 | 35.7 | 35.5 |
| Thickness of dense layer (μm) | less than 1 | 3 | 5 | 5 | 2 | less than 1 | 3 | 4 | 4 |
| Pure water permeation rate (L/hr · m² · bar) | 482 | 175 | 201 | 230 | 256 | 423 | 450 | 432 | 342 |
| Bubble point (MPa) | 1.69 | 1.72 | 1.7 | 1.72 | 1.73 | 1.78 | 1.29 | 1.6 | 1.66 |
| $F_{180}/F_{60}$ | 0.71 | 0.83 | 0.71 | 0.71 | 0.71 | 0.38 | 0.9 | — | — |
| Integrated permeability of immunoglobulin for 180 minutes (kg/m²) | 19.8 | 8.2 | 8.2 | 9.5 | 10.6 | 4.8 | 24.6 | — | — |
| LRV | 4 | 5 or more | 5 or more | 5 or more | 4 | 3 | 1 | — | — |
| Elution (%) | — | — | — | — | — | — | — | 42 | — |

The present application is based on the Japanese Patent Application No. 2014-170768 filed on Aug. 25, 2014, the content of which is incorporated herein by reference.

INDUSTRIAL APPLICABILITY

The porous membrane according to the present invention can suitably be used in purification of fractionated plasma products, biopharmaceutical, and so on, and therefore has industrial applicability.

The invention claimed is:
1. A porous membrane containing:

a hydrophobic polymer; and a water-insoluble hydrophilic polymer, the porous membrane having:

a dense layer in a downstream portion of filtration in the membrane;

a gradient asymmetric structure wherein an average pore diameter of pores increases from the downstream portion of filtration toward an upstream portion of filtration in the membrane;

a gradient index of the average pore diameter from the dense layer to a coarse layer of 0.5 to 12.0;

a porosity in the dense layer is 35.1% or more and 45.0% or less; and a value of a standard deviation of pore diameters/the average pore diameter in the dense layer is 0.85 or less.

2. The porous membrane according to claim 1, the porous membrane further having:

an integrated permeability of immunoglobulin for 180 minutes of 8.0 to 20.0 kg/m$^2$ when 1.5% by mass of the immunoglobulin is filtered at a constant pressure of 2.0 bar; and a ratio of immunoglobulin flux F180 at 180 minutes after starting filtration to immunoglobulin flux F60 at 60 minutes after starting filtration of 0.70 or more.

3. The porous membrane according to claim 1, wherein an existence ratio of pores of 10 nm or smaller in the dense layer is 8.0% or less.

4. The porous membrane according to claim 1, wherein an existence ratio of pores of larger than 10 nm and 20 nm or smaller in the dense layer is 20.0% or more and 35.0% or less.

5. The porous membrane according to claim 1, wherein the water-insoluble hydrophilic polymer is electrically neutral.

6. The porous membrane according to claim 1, wherein a pure water permeation rate is 160 to 500 L/hr·m$^2$·bar.

7. The porous membrane according to claim 1, wherein a thickness of the dense layer is 1 to 8 μm.

8. The porous membrane according to claim 1, wherein the hydrophobic polymer is a polysulfone-based polymer.

9. The porous membrane according to claim 1, wherein the water-insoluble hydrophilic polymer is a vinyl-based polymer.

10. The porous membrane according to claim 1, wherein the water-insoluble hydrophilic polymer is a polysaccharide or a derivative thereof.

11. The porous membrane according to claim 1, wherein the water-insoluble hydrophilic polymer is a polyethylene glycol or a derivative thereof.

12. A method for removing a virus contained in a protein solution, comprising:

filtering the protein solution through the porous membrane according to claim 1, wherein, in the filtering, the protein solution first passes through the coarse layer and subsequently passes through the dense layer.

13. The porous membrane according to claim 1, further comprising:

the dense layer having an average pore diameter of 50 nm or smaller;

the coarse layer having an average pore diameter of larger than 50 nm; and wherein the gradient index is indicated by expression (1):

(average pore diameter of a visual field of the coarse layer−average pore diameter of a visual field of the dense layer)/1, and wherein the visual field of the coarse layer and the visual field of the dense layer are adjacent to each other and taken at a boundary where an average pore diameter changes from 50 nm or smaller to larger than 50 nm.

14. The porous membrane according to claim 1, wherein a thickness of the dense layer is 2 to 8 μm.

* * * * *